US011042162B2

(12) United States Patent
Kowalchuk

(10) Patent No.: US 11,042,162 B2
(45) Date of Patent: Jun. 22, 2021

(54) SYSTEM AND METHOD FOR DETERMINING WORK ROUTES FOR AGRICULTURAL VEHICLES

(71) Applicant: CNH Industrial Canada, Ltd., Saskatoon (CA)

(72) Inventor: Trevor L. Kowalchuk, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 322 days.

(21) Appl. No.: 16/130,372

(22) Filed: Sep. 13, 2018

(65) Prior Publication Data

US 2020/0089242 A1 Mar. 19, 2020

(51) Int. Cl.
*G05D 1/02* (2020.01)

(52) U.S. Cl.
CPC ......... *G05D 1/0219* (2013.01); *G05D 1/0297* (2013.01); *G05D 2201/0201* (2013.01)

(58) Field of Classification Search
None
See application file for complete search history.

(56) References Cited

U.S. PATENT DOCUMENTS

| | | | |
|---|---|---|---|
| 7,505,848 | B2 | 3/2009 | Flann et al. |
| 8,170,785 | B2 | 5/2012 | Diekhans et al. |
| 8,738,238 | B2 | 5/2014 | Rekow |
| 9,164,513 | B2 | 10/2015 | Matsuzaki et al. |
| 2015/0354961 | A1* | 12/2015 | Reinecke ............. A01B 69/008 701/25 |
| 2016/0109885 | A1 | 4/2016 | Fujimoto et al. |
| 2016/0120095 | A1 | 5/2016 | Fujimoto et al. |
| 2016/0174453 | A1 | 6/2016 | Matsuzaki et al. |
| 2017/0144702 | A1* | 5/2017 | Dang .................. A01B 69/008 |
| 2018/0243771 | A1* | 8/2018 | Davis ................... A01M 7/006 |
| 2018/0359904 | A1* | 12/2018 | Foster ................. G06Q 10/047 |

OTHER PUBLICATIONS

Noguchi et al., Cooperation of Two Robot Tractors to Improve Work Efficiency, Advances in Robotics & Automation, vol. 5, Issue 2, 2016, 11 Pages. http://www.omicsgroup.org/journals/cooperation-of-two-robot-tractors-to-improve-work-efficiency-2168-9695-1000146.php?aid=71927.

(Continued)

*Primary Examiner* — Kelly D Williams
(74) *Attorney, Agent, or Firm* — Rebecca L. Henkel; Rickard K. DeMille

(57) ABSTRACT

A first and second work vehicle may be configured to perform agricultural operations within a working area of a field. A controller may be configured to divide a plurality of swath lines extending between opposed ends of the working area into first and second work route segments, which are separated by a transition region positioned between the opposed ends and respectively assigned by the controller to the first and second work vehicles. The controller may instruct the work vehicles to perform the agricultural operations based on the respective first and second work route segments of the swath lines. For example, the instructions may include that the work vehicles transition between adjacent swath lines at the respective transition regions, that the work vehicles begin working simultaneously or sequentially, and/or that the work vehicles work one or more of the swath lines simultaneously for at least a period of time.

20 Claims, 8 Drawing Sheets

(56) References Cited

OTHER PUBLICATIONS

Emimi et al., New Trends in Robotics for Agriculture: Integration and Assessment of a Real Fleet of Robots, The Scientific World Journal, vol. 2014, Article ID 404059, Mar. 2014, 29 pages. http://dx.doi.org/10.1155/2014/404059.

Spekken et al., Optimized Routing on Agricultural Fields by Minimizing Maneuvering and Servicing Time, Precision Agriculture, vol. 14, Issue 2, Apr. 2013, pp. 224-244. (Abstract Only) http://link.springer.com/article/10.1007/s11119-012-9290-5.

\* cited by examiner

SYSTEM AND METHOD FOR DETERMINING WORK ROUTES FOR AGRICULTURAL VEHICLES

FIELD OF THE INVENTION

The present subject matter relates generally to agricultural vehicles, and, more particularly, to a system and method for determining work routes of multiple autonomous agricultural vehicles operating within an agricultural worksite.

BACKGROUND OF THE INVENTION

The operation of agricultural vehicles is becoming increasingly automated. For example, harvesters, planters, tillers and the like are often now configured to operate autonomously or semi-autonomously for various applications. Autonomous vehicles may be configured to follow a lead vehicle which may be driven by a human operator. In some applications, the autonomous vehicle may perform the same operation as the lead vehicle. For example, a lead planter may be followed by an autonomous planter in an adjacent swath, thereby doubling the effective width covered in a single pass of the planting operation. However, the autonomous vehicles may be elsewise configured to operate a given operation independently of other vehicles.

When all of the work vehicles are driven by human operators, the operators are able to avoid collisions when making passes across a field or worksite. However, when one or more of the work vehicles operate autonomously or semi-autonomously, complicated logic and/or additional collision avoidance systems must be added to the work vehicles' guidance systems to prevent collisions. Further, when multiple swaths are being simultaneously worked, it is difficult for an operator to monitor all of the vehicles when entire swaths are assigned to each of the vehicles, as the vehicles may be spread out across a large area.

Accordingly, a system and related method for determining work routes of multiple autonomous agricultural vehicles within an agricultural worksite that mitigate potential collision and monitoring issues would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for determining work routes for agricultural work vehicles. The method may include accessing, with a computing device, a plurality of swath lines associated with a working area, the plurality of swath lines extending between opposed ends of the working area. The method may further include determining, with the computing device, first and second work route segments for each swath line of the plurality of swath lines to guide first and second work vehicles when performing an agricultural operation within the working area. The first work route segment may extend along a first section of each swath line and the second work route segment may extend along a second section of each swath line, where the first and second work route segments terminate at a transition region of each swath line positioned between the opposed ends of the working area. The method additionally includes assigning, with the computing device, each of the first work route segments to the first work vehicle, method further includes assigning, with the computing device, each of the second work route segments to the second work vehicle. Additionally, the method may include transmitting, with the computing device, instructions to at least one of the first work vehicle or the second work vehicle for performing the agricultural operation within the working area based on at least one of the first and second work route segments.

In another aspect, the present subject matter is directed to a system for determining work routes for agricultural work vehicles. The system may generally include a first work vehicle and a second work vehicle, each of the first and second work vehicles being configured to perform agricultural operations within the working area. The system may also include a controller communicatively coupled to the first and second work vehicles. The controller may include a processor and associated memory, the memory storing instructions that can be executed by the processor. The controller may be configured to access a plurality of swath lines associated with the working area, the plurality of swath lines extending between opposed ends of the working area. The controller may further be configured to determine first and second work route segments for each swath line of the plurality of swath lines to guide the first and second work vehicles when performing the agricultural operation within the working area. The first work route segment may extend along a first section of each swath line and the second work route segment may extend along a second section of each swath line. The first and second work route segments may terminate at a transition region of each swath line positioned between the opposed ends of the working area. The controller may additionally be configured to assign each of the first work route segments to the first work vehicle and to assign each of the second work route segments to the second work vehicle. Additionally, the controller may be configured to transmit instructions to at least one of the first work vehicle or the second work vehicle for performing the agricultural operation within the working area based on at least one of the first and second work route segments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
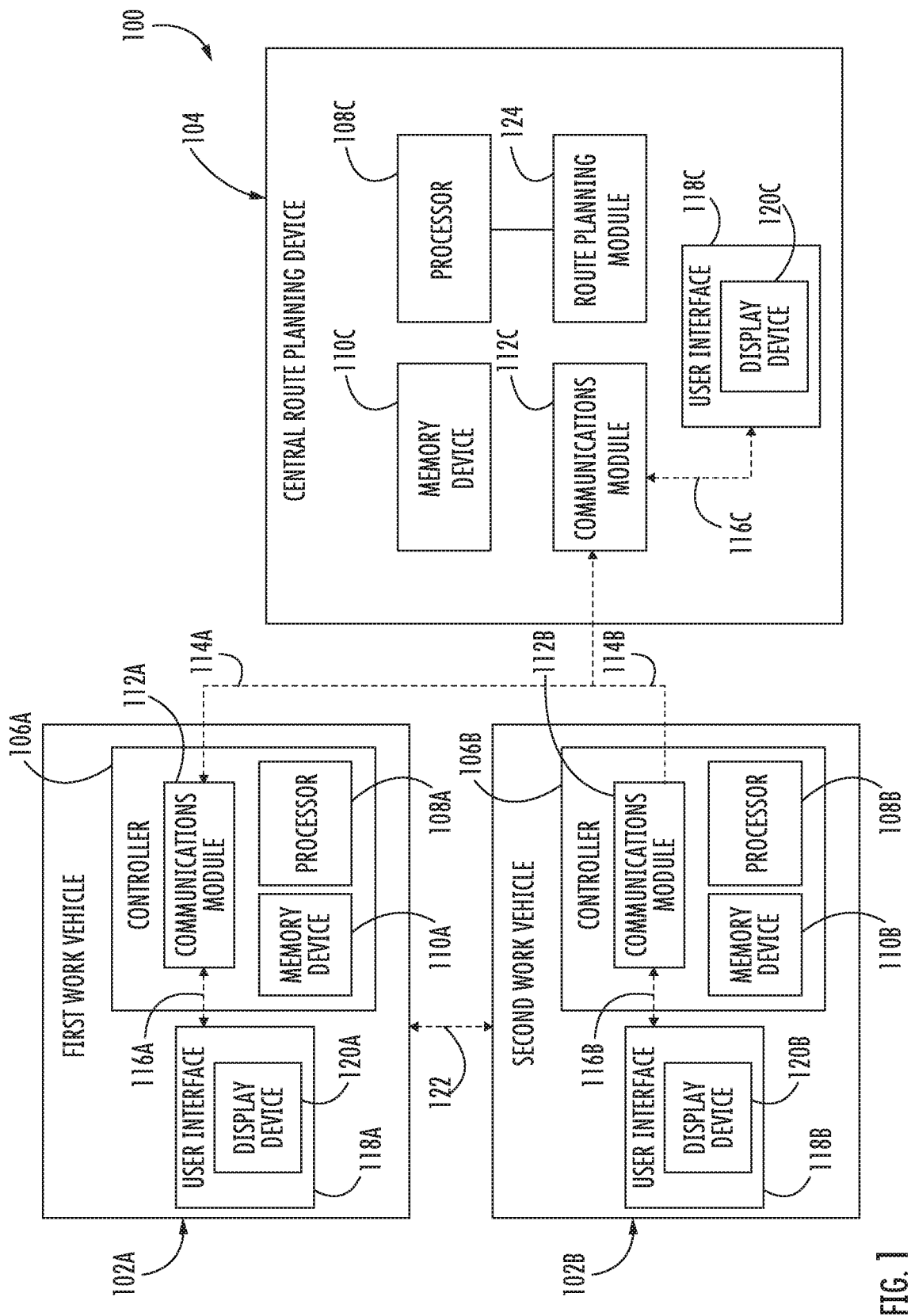
FIG. 1 illustrates a perspective view of one embodiment of a system for determining work routes for first and second agricultural work vehicles in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for determining work routes for agricultural work vehicles. Specifically, in several embodiments, two or more agricultural work vehicles may be configured to perform an agricultural operation within a working area of a field. In some embodiments, the work vehicles may be configured such that they move through the working area autonomously, without any input from an operator, or semi-autonomously, where an operator provides at least some input. The working area may be divided into several swath lines corresponding to the expected locations of each pass across the field. In one embodiment, the disclosed system may be configured to divide each swath line into first and second segments separated by an interior transition region. In such an embodiment, a first work vehicle may be assigned to work the first segment of each of the swath lines, while a second work vehicle may be assigned to work the second segment of each of the swath lines. After working their respective segments along a given swath line, each of the work vehicles may be configured to execute a turn within the interior transition region of the worked swath line to allow such work vehicle to transition to the interior transition region of an adjacent swath line. As such, the vehicles may be configured to make turns within the working area or interior of the field, instead of only at the headlands positioned outside or at the opposed ends of the working area.

In one embodiment, when first and second work vehicles are operating simultaneously along the same swath line of a given working area, the interior transition region associated with such swath line may be positioned and/or the work vehicles may be controlled such that the work vehicles do not simultaneously reach the transition region. As such, the work vehicles may be less likely to collide at a turning point within the transition region. Additionally, the interior transition regions associated with the working area of a field may be positioned and/or the work vehicles may be controlled such that the work vehicles are only configured to work one or more of the swath lines simultaneously for a short period of time. As such, the work routes generated for the work vehicles may allow the work vehicles to work more closely together within the field without risk of collision and with better visibility for an operator to simultaneously monitor the vehicles within the field.

Referring now to the drawings, FIG. 1 illustrates a schematic diagram of a system 100 for determining work routes for agricultural work vehicles working within a field or working area. In general, the system 100 includes a first agricultural work vehicle 102A, a second agricultural work vehicle 102B, and a central route planning unit 104. In one embodiment, the first and second agricultural work vehicles 102A, 102B (hereinafter referred to as "work vehicles 102A, 102B") are configured as autonomous or semi-autonomous agricultural vehicles, such as autonomous or semi-autonomous tractors, harvesters, self-propelled windrowers, self-propelled sprayers, and/or the like. The operation of each work vehicle 102A, 102B may be configured to be controlled by its respective vehicle controller 106A, 106B, as will be described in greater detail below. In one embodiment, the central route planning unit 104 may be configured to developing and transmitting one or more instructions or plans corresponding to work routes for allowing the first and second work vehicles 102A, 102B to simultaneously perform an agricultural operation within a given working area and may further be configured to be in operative communication with the controllers 106A, 106B of the first and second agricultural work vehicles 102A, 102B to provide such instructions or plans to the controllers 106A, 106B. Each respective vehicle controller 106A, 106B may then control the operation of its associated work vehicle 102A, 102B based on the instructions or plans received from the central route planning unit 104.

It should be appreciated that the configuration of the system 100 described above and shown in FIG. 1 is only provided to place the present subject matter in an exemplary field of use. Thus, it should be appreciated that, although the system 100 is described in the context of two work vehicles, the system 100 may be readily adaptable to any number of work vehicles operating within a given field or across numerous fields. It should further be appreciated that the operations of the central route planning unit 104 may instead be carried out and shared by one or more of the vehicle controllers 106A, 106B, such that the system 100 does not include a central route planning unit 104 separate from the controllers 106A, 106B, as will be described in further detail below.

In general, each vehicle controller 106A, 106B may be configured to control the operation of one or more components of its respective work vehicle 102A, 102B. For instance, in several embodiments, each vehicle controller 106A, 106B may be configured to control the operation of an engine and/or a transmission of its corresponding work vehicle 102A, 102B to adjust the vehicle's ground speed. In general, each vehicle controller 106A, 106B may correspond to any suitable processor-based device(s), such as a computing device or any combination of computing devices. Thus, as shown in FIG. 1, each controller 106A, 106B may each generally include one or more respective processors 108A, 108B and associated memory devices 110A, 110B configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 110A, 110B may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 110A, 110B, may generally be configured to store information accessible to the processor(s) 108A, 108B, including data that can be retrieved, manipulated, created. and/or stored by the processor(s) 108A, 108B and instructions that can be executed by the processor(s) 108A, 108B.

Additionally, each of the vehicle controllers 106A, 106B may be configured to include a respective communications module 112A, 112B to allow for each controller 106A, 1069 to communicate with any of the various other system components described herein. For instance, in one embodiment, the communications modules 112A, 112B may allow for each vehicle controller 106A, 106B to communicate with the central route planning unit 104 via one or more communicative links 114A, 114B. For instance, the communicative links 114A, 114B may corresponds to wireless links to allow data (including instructions and plans) to be transmitted wirelessly between the vehicle controllers 106A, 106B and the central route planning unit 104. Alternatively, a wired communication interface e.g., one or more data buses) may be provided between the central route planning unit 104 and one or both of the communications modules 112A, 112B. Additionally, the communications modules 112A, 112B may also allow for each vehicle controller 106A, 106B to communicate with the other vehicle controller 106A, 106B via one or more communicative links 122 (e.g., a wireless link allowing for vehicle-to-vehicle communications). Moreover, one or more communicative links 116A, 116B, such as a wired and/or wireless connection, may be provided between each communications module 112A, 112B and a user interface 118A, 118B having a respective display device 120A, 120B of the associated work vehicle 102A, 102B.

In several embodiments, the central route planning unit 104 may correspond to or include one or more processing devices, such as a computing device or combination of computing devices. Thus, similar to the vehicle controllers 106A, 106B, the central route planning device 104 may include one or more processors 108C and associated memory devices 110C configured to perform a variety of computer-implemented functions (e.g., performing the methods, steps, algorithms, calculations and the like disclosed herein). In addition, the central route planning device 104 may include a communications module 112C configured to facilitate communications between the central route planning unit 104 and one or more remote devices, such as the vehicle controllers 106A, 106B. For instance, the communications module 112C of the central route planning unit 104 may be configured to communicate wirelessly with the communications module 112A, 112E of each vehicle controller 106A, 106B via the associated wireless communication link(s) 114A, 114B. In some embodiments, the central route planning device 104 may also be connected via a communicative link 116C to its own user interface 118C having a display device 120C, configured the same as or similar to the user interfaces 118A, 118B, as will be discussed in greater detail below.

As shown in FIG. 1, in several embodiments, the central route planning unit 104 corresponds to a separate device positioned remote to the first and second work vehicles 102A, 102B. For instance, the central route planning unit 104 may be located remote to the field or working area within which the work vehicles 102A, 102B are operating. In such instance, data may be transmitted between the central route planning unit 104 and each vehicle controller 106A, 106B via an associated communicative link(s) 114A, 114E or may be transmitted between the central route planning unit 104 and only one of the vehicle controllers 106A, 10613, in which case the vehicle controller 106A, 106 B in communication with the central route planning unit 104 may be configured to communicate any necessary data to the other vehicle controller 106A, 106B via a suitable communicative link 122. In an alternative embodiment, the central route planning unit 104 may be installed onboard or form part of one of the work vehicles 102A, 102B, such as by including the central route planning unit 104 with or as part of one of the vehicle controllers 106A, 106B. In such an embodiment, data from the central route planning unit 104 may be communicated to the other vehicle 102A, 102B via the communicative link 122 provided therebetween.

Additionally, in several embodiments, the central route planning unit 104 may include one or more modules in communication with or farming part of the processor 108C. For example, as shown in FIG. 1, the central route planning unit 104 may be configured to include and execute a route planning module 124. In general, the route planning module 124 may be configured to receive or generate information associated with the working area (e.g., the position and orientation of predetermined swath lines for the working area) and to develop route plan instructions for one or both of the work vehicles 102A, 102B. The route plan instructions may then be transmitted or communicated to the controllers 106A, 1063 of the work vehicles such that each controller 106A, 106B may automatically begin implementing the instructions or may further transmit the route plan instructions to one or more of the user interfaces 118A, 118B, 118C to display the route plan instructions to the operator and/or to allow for the operator to make changes to such instructions.

In accordance with aspects of the present subject matter, the route plan instructions developed by the central route planning unit 104 may be adapted to guide the work vehicles 102A, 102B in safely and efficiently performing an agricultural operation within the same field or working area while avoiding collisions. For example, as will be described below, in several embodiments, it may be desirable for both vehicles 102A, 102B to be simultaneously performing an agricultural operation along the same swath line within the field. For instance, the first work vehicle 102A may initiate the performance of an agricultural operation along a given swath line at one end of the field (e.g., the North end) while the second work vehicle 102B may initiate the performance of the same agricultural operation along such swath line at the opposed end of the field (e.g., the South end) such that the work vehicles 102A, 102B are moving towards one another along the swath line being worked. In such instance, suitable route plan instructions may be generated so that the work vehicles 102A, 102B do not collide within the interior of the field at a given location along the swath line. For instance, in one embodiment, the starting times for work vehicles 102A, 102B along the associated swath line may be staggered or offset such that one of the vehicles 102A, 102B is guided when performing the agricultural operation along the portion of the swath line for which it is responsible and turn or transition to an adjacent swath line prior to the other vehicle 102A, 102B reaching such transition location, thereby avoiding any potential collisions between the vehicles 102A, 102B. In another embodiment, the route plan instructions generated for guiding the work vehicles 102A, 102B may divide each swath line into separate sections of differing lengths so that the work vehicle 102A, 102B responsible for working the shortest portion of the swath line can complete its operation and turn or transition to an adjacent swath line prior to the other vehicle 102A, 102B reaching such transition location.

Once the route plan instructions have been developed by the central route planning unit 104, the central route planning unit 104 may transmit the instructions to the first and/or second work vehicle 102A, 102B for performing the agricultural operations. More specifically, as discussed above, the central route planning unit 104 may transmit the instructions to the vehicle controllers 106A, 106B of the first and second work vehicles 102A, 102B.

Figure 2A:
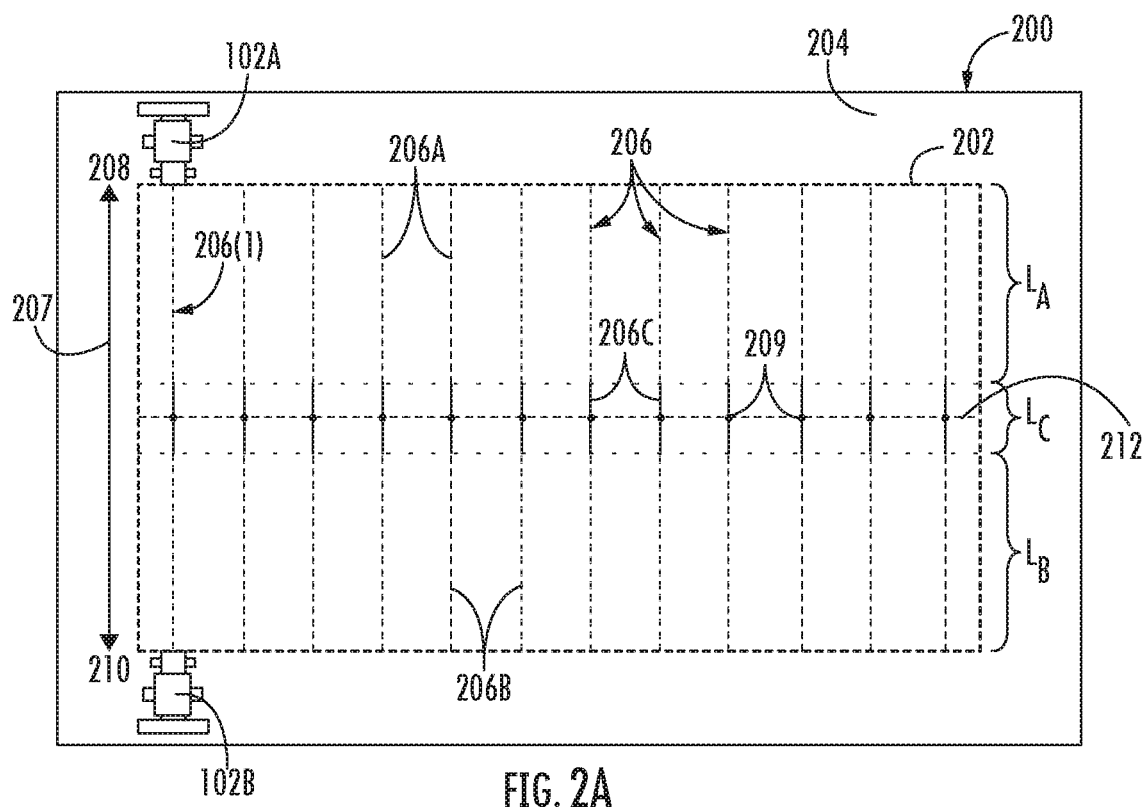
FIGS. 2A-D illustrate a sequence of schematic views across which first and second agricultural work vehicles are shown making passes across a field along one example embodiment of work routes determined in accordance with aspects of the present subject matter.
Figure 2B:
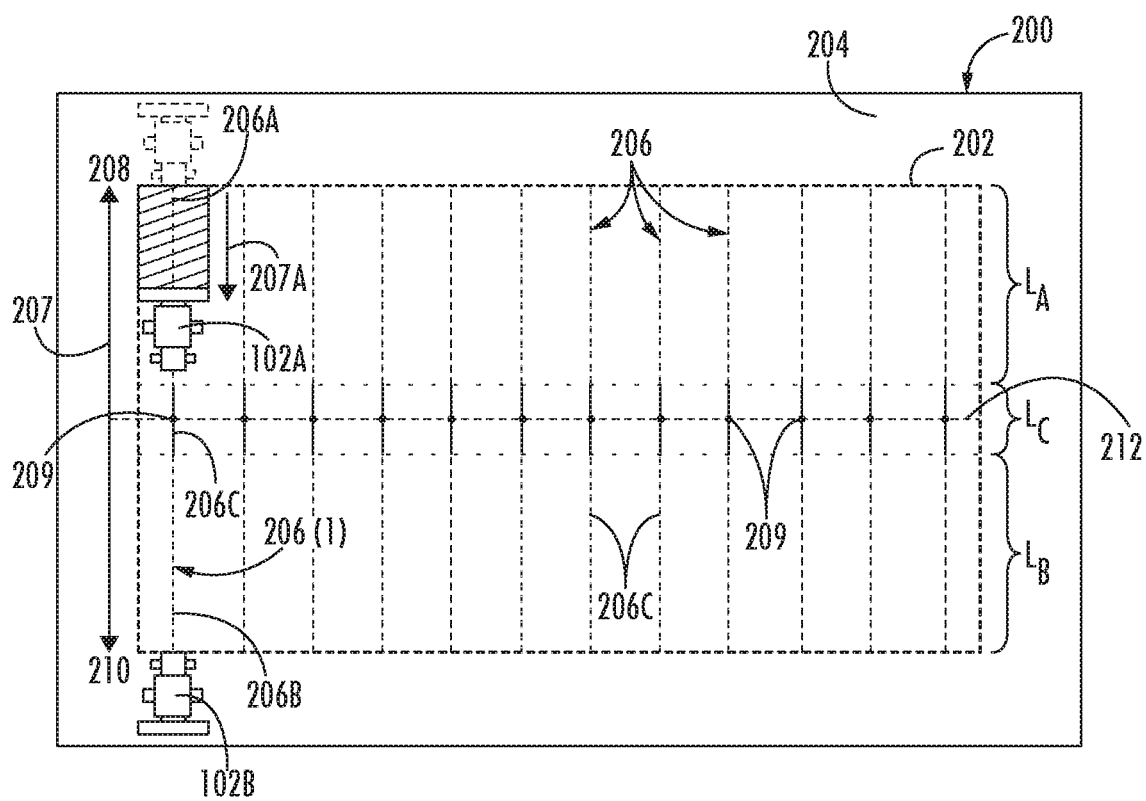
Figure 2C:
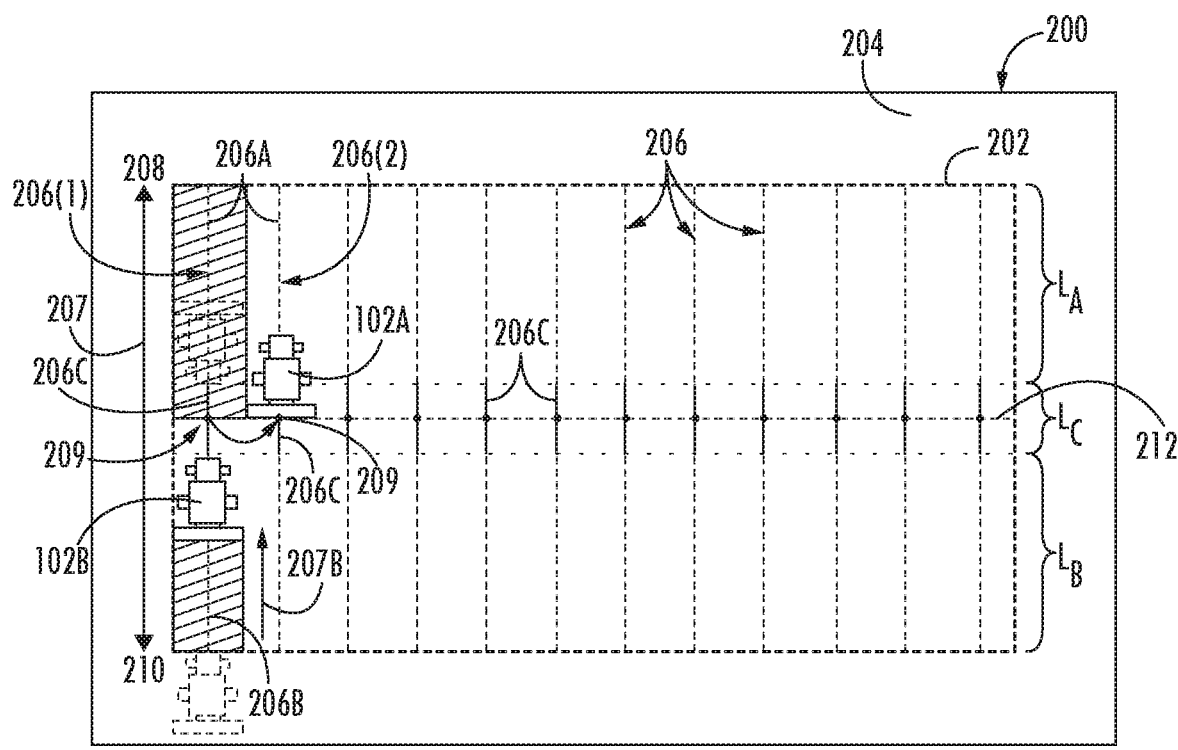
Figure 2D:
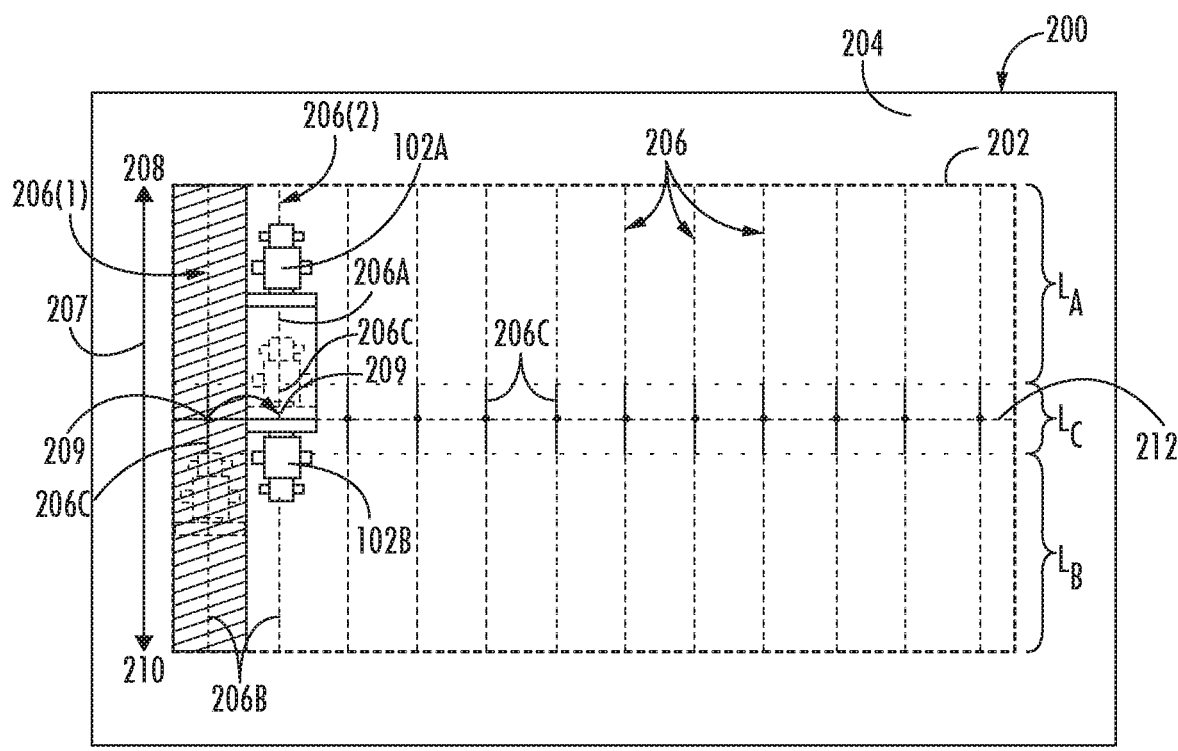

Referring now to FIGS. 2A-2D, a sequence of views providing one example of the implementation or execution of suitable route plan instructions that may be generated for guiding the work vehicles 102A, 102B described above with reference to FIG. 1 to perform an agricultural operation within a field 200 are illustrated in accordance with aspects of the present subject matter. Specifically, FIGS. 2D-2D illustrate schematic views of sequential movements of the work vehicles 102A, 1029 within the field 200 after various time periods have elapsed in accordance with the route plan instructions transmitted to the work vehicles 102A, 102B. More specifically, FIG. 2A shows illustrates a schematic view of the work vehicles 102A, 102B in an initial position within the field 200, FIG. 2B illustrates a schematic view of the work vehicles 102A, 102B within the field 200 after a first period of time has elapsed since initiation of the agricultural operation. FIG. 2C illustrates a schematic view of the work vehicles 102A, 102B within the field 200 after a second period of time (longer than the first period of time) has elapsed since initiation of the agricultural operation, and FIG. 2D illustrates a schematic view of the work vehicles 102A, 102B within the field 200 after a third period of time (longer than the first and second periods of time) has elapsed since initiation of the agricultural operation.

As shown in the embodiment illustrated in FIGS. 2A-2D, the field 200 includes a working area 202 and a headland area 204 surrounding at least a portion of the working area 202. The working area 202 extends in an operating direction of the vehicles 102A, 102B (indicated by arrows 207 in FIGS. 2A-2D) between a first end 208 and a second end 210. Additionally, as shown in FIGS. 2A-2D, a plurality of swath lines 206 extend in the operating direction 207 between the first and second ends 208, 210 of the working area 202. As is generally understood, the swath lines 206 may correspond to predetermined or pre-generated guidance lines representing anticipated or desired paths across the field 200 for performing an agricultural operation (e.g., a tillage operation, planting operation, harvesting operation, spraying operation, and/or the like). Such guidance or swath lines 206 may be stored within the memory of one or more components of the disclosed system 100, such as the memory 110A, 110B of one or both of the vehicle controllers 106A, 106B and/or the memory 110C of the central route planning unit 104. For instance, the central route planning unit 104 may be configured to access the predetermined swath lines 206 stored within its memory 110C in order to determine or generate the route plan instructions for guiding the work vehicles 102A, 102B.

In several embodiments, the route plan instructions developed for the work vehicles 102A, 102B (e.g., by the central route planning unit 104), may subdivide each swath line 206 into a first work route segment 206A and a second work route segment 206B. As shown in the illustrated embodiment, each first work route segment 206A extends along a first section or length $L_A$ of each swath line 206 while each second work route segment 206B extends along a second section or length $L_B$ of each swath line 206. Additionally, in accordance with aspects of the present subject matter, the first and second work route segments 206A, 206B (hereinafter referred to simply as "first and second segments 206A, 206B") are separated along each swath line 206 by an interior transition region 206C extending along a third section or length $L_C$ of such swath line 206.

In the embodiment shown, the interior transition region 206C defined along each swath line 206 is centrally located within the working area. 202 between its first and second ends 208. 210 such that the first and second segments 206A, 206B of each swath line 206 are of equal length. Since the various transition regions 206C are generally positioned at the same location along each swath line 206 in the operating direction 207, such transition regions 206C are generally shown in the illustration embodiment as a singular transition region in dotted lines within the working area 202. The transition regions 206C may generally be centered about a centerline 212 of the working area 202 such that the transition regions 206C extend symmetrically outwardly from the centerline 212 towards the first and second ends 208, 210. For example, the transition regions 206C may extend along 10% of the length 207 of the working area 202 from either side of the centerline 212 towards the first and second ends 208, 210. In another example, the transition regions 206C may extend less than 10%, such as less than 5% of the length 207 from either side of the centerline 212 towards the first and second ends 208, 210 or less than 2% of the length 207 from either side of the centerline 212 towards the first and second ends 208, 210 or less than 1% of the length 207 from either side of the centerline 212 towards the first and second ends 208, 210. The transition segments 206C may alternatively extend along any suitable portion of the length 207 of the working area 202 from either side of the centerline 212.

Additionally, each interior transition region 206C may further be associated with one or more midland turning points 209. For example, the route plan instructions for performing a given agricultural operation within the working area 202 may be associated with instructing the work vehicles 102A, 102B to transition between adjacent swath lines 206 at the midland turning point(s) 209, generally associated with the intersection of such swath lines 206 with the centerline 212. In FIGS. 2A-2D, only one midland turning point 209 is shown within the interior transition region 206C associated with each swath line 206. However, this should not be construed as limiting. For example, each transition region 206C may be associated with a first midland turning point (not shown) assigned to the first work vehicle 102A and a second midland turning point (not shown) assigned to the second work vehicle 102B, with the first and second midland turning points being positioned at the same or different positions within the transition region 206C provided along each swath line 206.

In several embodiments, the route plan instructions generated by the central route planning unit 104 may assign each work vehicle 102A, 102B to work a given set of route segments (e.g., the first segments 206A or the second segments 206B). For instance, in the embodiment shown in FIGS. 2A-2D, the first work vehicle 102A has been assigned to work the first route segments 206A while the second work vehicle 102B has been assigned to work the second route segments 206B. As the first and second segments 206A, 206B do not laterally overlap (e.g., in the direction perpendicular to the operating direction 207), such assignments prevent the first and second vehicles 102A, 102B from working directly, laterally adjacent to one another within adjacent swath lines 206. Thus, the vehicles 102A, 102B are less likely to collide when working adjacent swath lines 206.

In some embodiments, the route plan instructions for the work vehicles 102A, 102B may provide that the work vehicles 102A, 102B simultaneously operate along the same swath line 206 (e.g., by generating instructions that include starting positions for the first and second work vehicles 102A, 102B along the same swath line 206. For example, the first and second work vehicles 102A, 102B may be instructed to initially move to opposed ends 208, 210 of the same swath line 206 before beginning to perform the agricultural operation within the working area 202. More specifically, as shown in FIG. 2A, the first work vehicle 102A is positioned at the first end 208 of a first swath line 206(1), while the second work vehicle 102B is positioned at the opposed, second end 210 of the first swath line 206(1). In such an embodiment, the first work vehicle 1024 is configured to travel along the first segment 206A of the first swath line 206(1) towards the associated transition region 206C in a first initial travel direction (shown with arrow 207A in FIG. 2B), while the second work vehicle 102B is configured to travel along the second segment 206B of the first swath line 206(1) towards the associated transition region 206C in a second initial travel direction (shown with arrow 207B in FIG. 2C), substantially opposite to the first initial travel direction 207A.

However, such initial starting positions and corresponding initial travel directions are only provided as exemplary examples. It should be appreciated that the first and second work vehicles 102A, 102B may instead be initially positioned at any other suitable location along the first swath line 206(1) and correspond to any suitable corresponding initial travel direction.

In general, depending on the initial positioning (and respective travel directions) of the work vehicles 102A, 102B within the working area 202, the central route planning unit 104 may further generate and include offset or differing starting times within the route plan instructions for the first and second work vehicles 102A, 102B. In the example shown in FIGS. 2A-2D, the transition region 206C and the corresponding midland turning point 209 of the first swath line 206(1) are generally positioned centrally between the first and second ends 208, 210 of the working area 202. Thus, the first and second work vehicles 102A, 102B are configured to respectively travel the same distance in the respective first and second initial travel directions 307A, 307B towards the midland turning point 209. In such an embodiment, the route plan instructions may specify that one of the work vehicles 102A, 102B (e.g., the first work vehicle 102A) begin working the first swath line 206(1) at a first starting time while the other work vehicle 102A, 102B (e.g., the second work vehicle 102B) remains at its initial position at the working area 202 (e.g., at the second end 210 of the first swath line 206(1)). After the first work vehicle 102A has finished working at least a portion of the first segment 206A of the first swath line 206(1), as shown in FIG. 2C, the second work vehicle 102B may then begin working the second segment 206B of the first swath line 206(1) at a second starting time. In several embodiments, the offset initial starting times may be evident throughout the operation of the remaining swath lines, such that the work vehicles 102A, 102B may be configured to sequentially begin working each of the remaining swath lines 206. With such offset starting times, the first and second work vehicles 102A, 102B are prevented from colliding, particularly at the centrally positioned midland turning point 209.

Additionally, in some embodiments, the starting times for the first and second work vehicles 102A, 102B may be generated such that the first and second work vehicles 102A, 102B simultaneously work each of the swath lines 206 for at least a period of time. As shown in FIG. 2C, after the second starting time, the first work vehicle 102A continues working the first segment 206A of the first swath line 206(1) while the second work vehicle 102B begins working the second segment 206B of the first swath line 206(1). Upon the first work vehicle 102A reaching the interior transition region 206C of the first swath line 206(1) after completing its associated work along the first segment 206A, the route plan instructions may then instruct the first work vehicle 102A to turn or transition at the midland turning point 209 of the first swath line 206(1) to the midland turning point 209 of an adjacent second swath line 206(2), while the second work vehicle 102B continues working the second segment 206B of the first swath line 206(1). As shown in FIG. 2D, the first and second work vehicles 102A, 102B may also work the respective first and second segments 206A, 206B of the second swath line 206(2) simultaneously for at least some period of time, as the first work vehicle 102A works a portion of the first segment 206A of the second swath line 206(2) while the second work vehicle finishes working the first swath line 206(1) and transitions to the second portion 206B of the second swath line 206(2). With such simultaneous working of each of the swath lines 206, the work vehicles 102A, 102B are kept more closely together within the field 200 to make overseeing and monitoring of the work vehicles 102A, 102B easier for the operator.

Figure 3A:
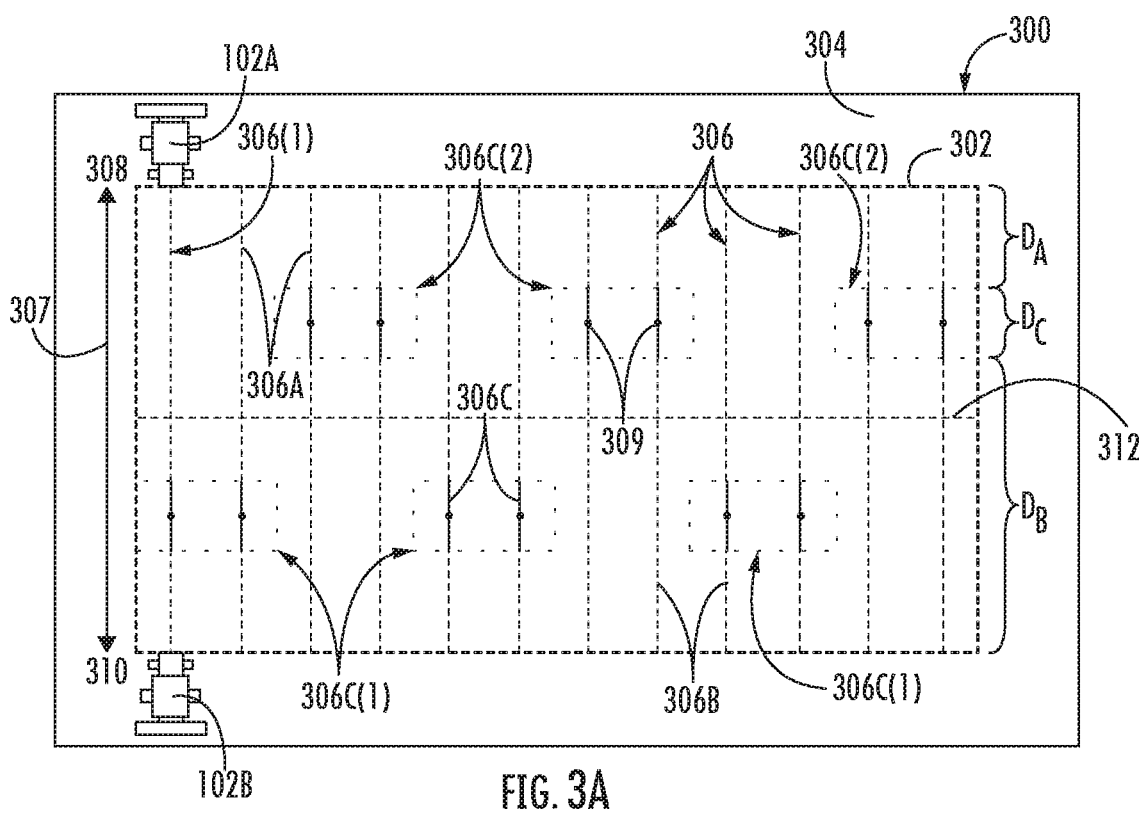
FIGS. 3A-3G illustrate another sequence of schematic views across which first and second agricultural work vehicles are shown making passes across a field along another example embodiment of work routes determined in accordance with aspects of the present subject matter.
Figure 3B:
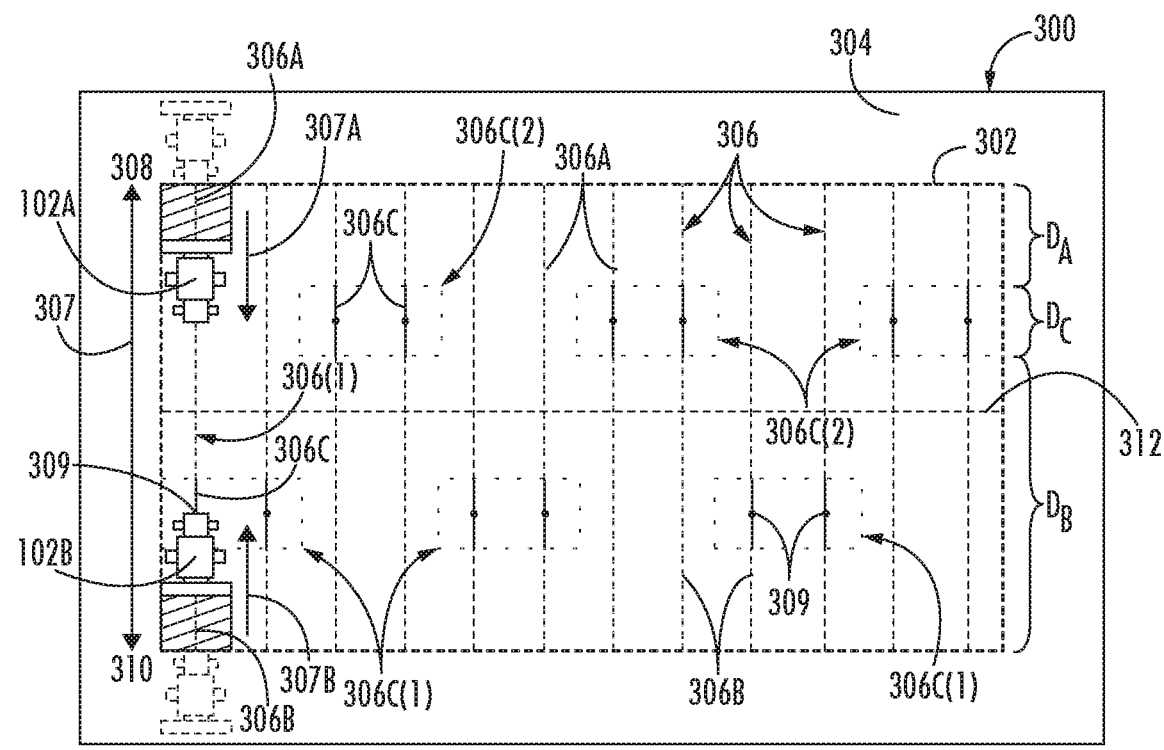
Figure 3C:
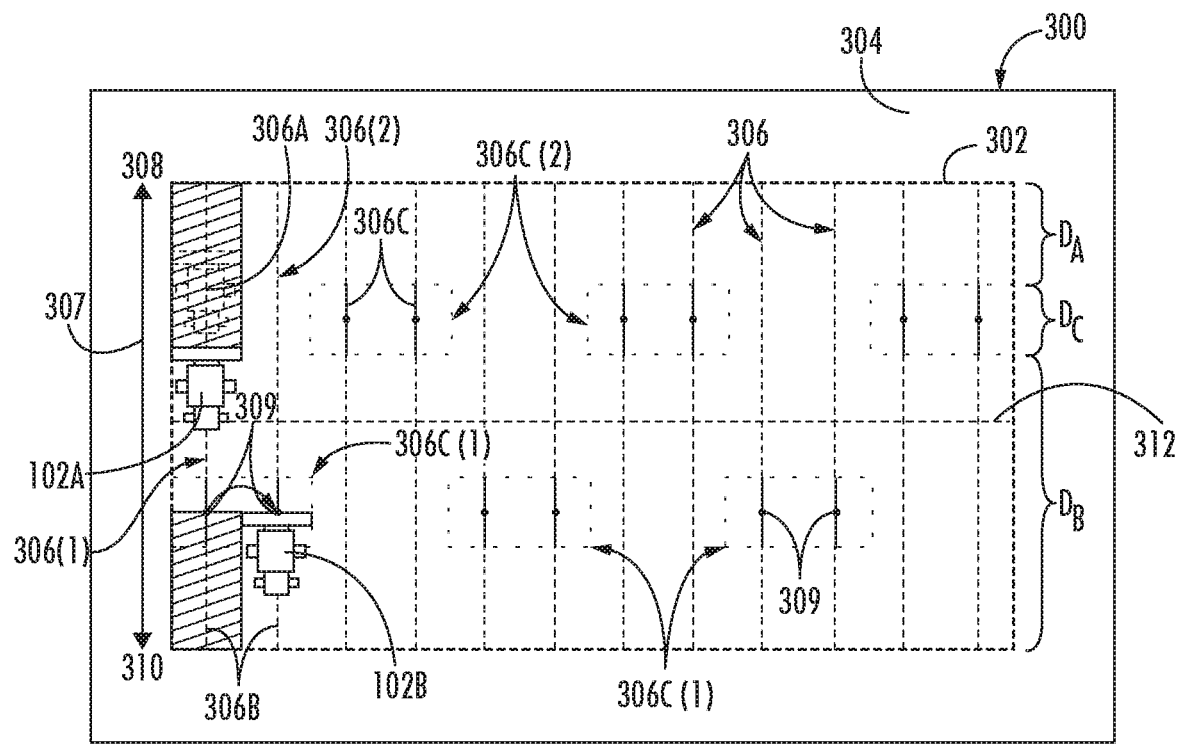
Figure 3D:
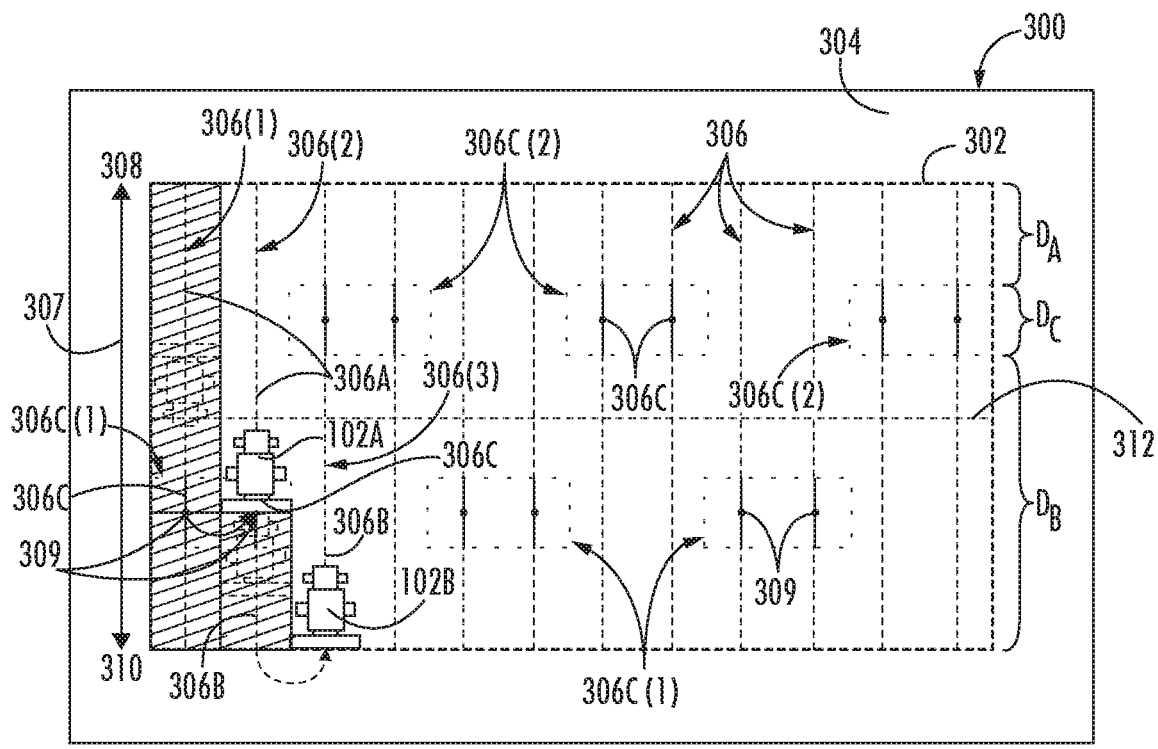
Figure 3E:
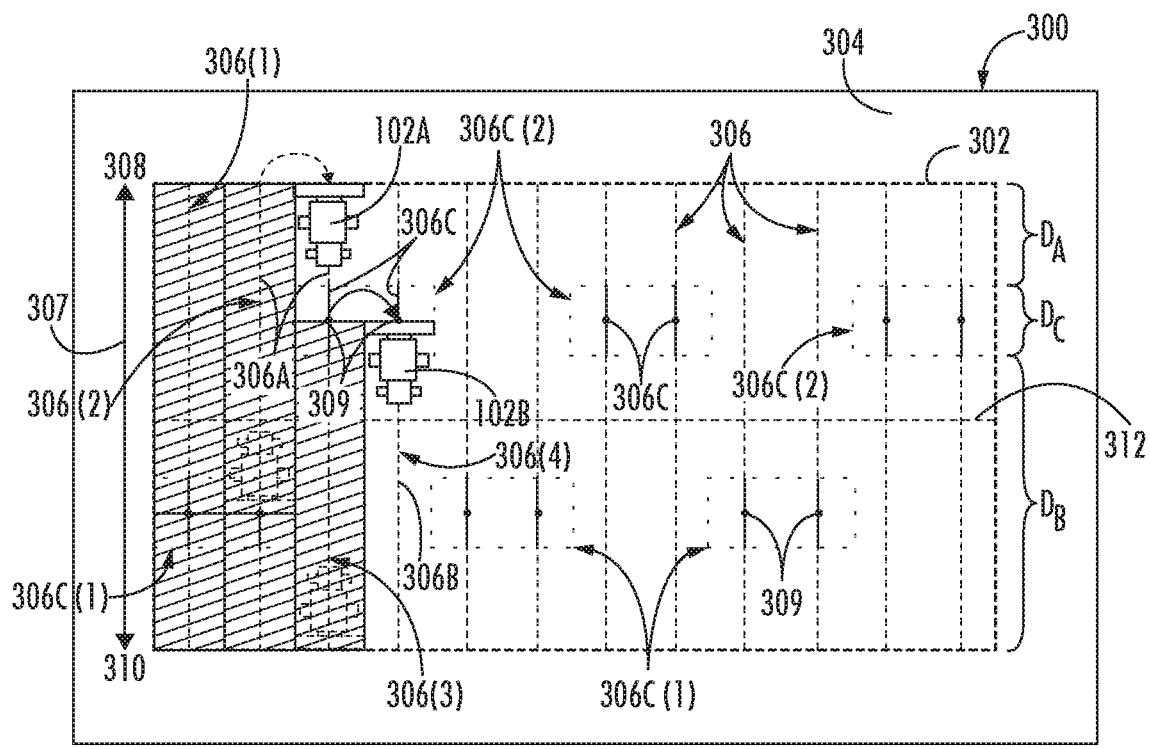
Figure 3F:
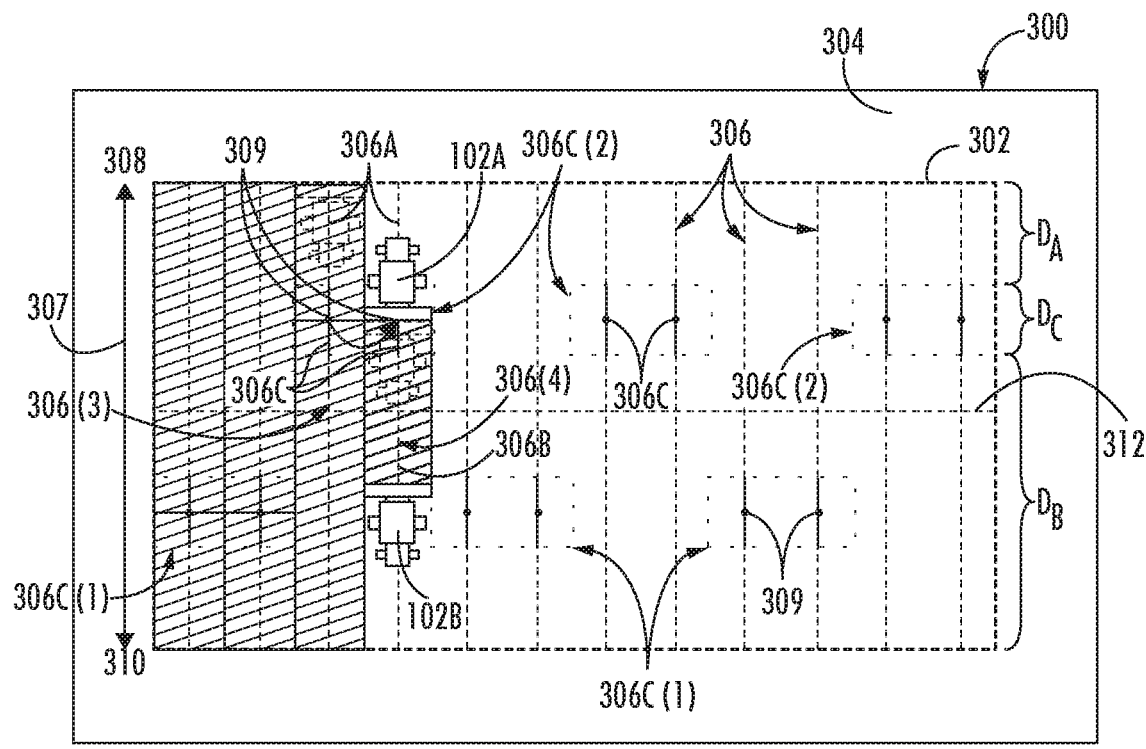
Figure 3G:
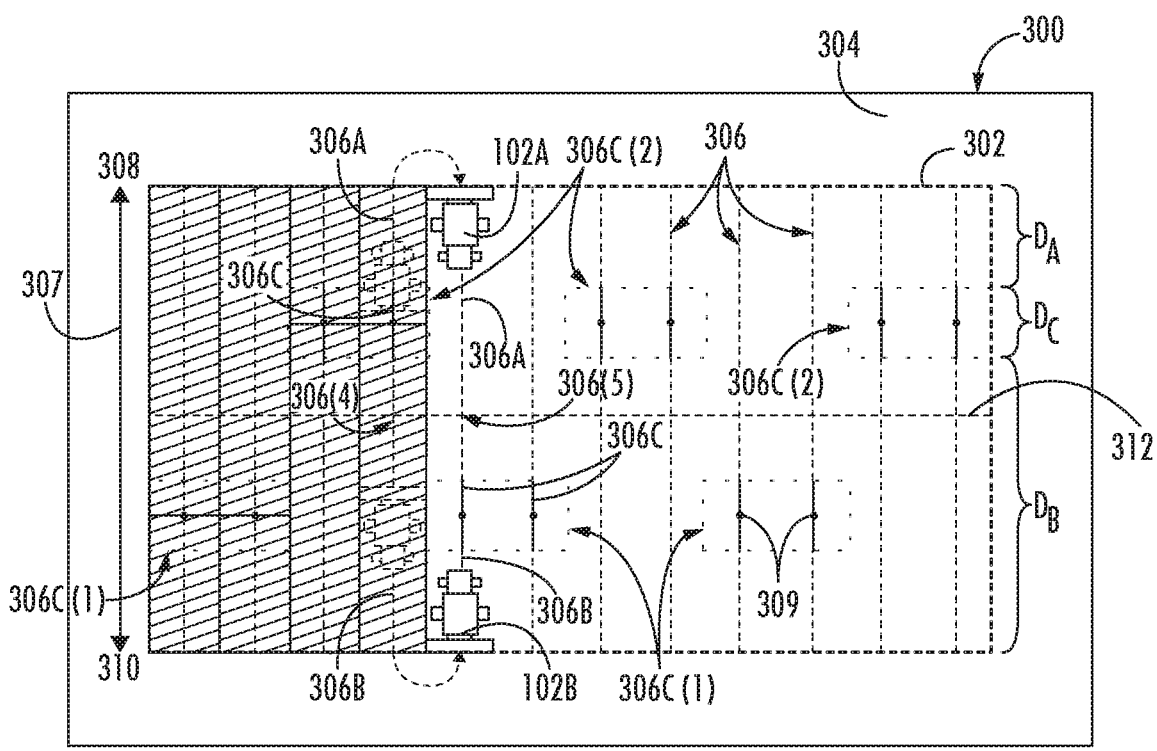

Referring now to FIGS. 3A-3G, another sequence of views providing a further example of the implementation or execution of suitable route plan instructions that may be generated for guiding the work vehicles 102A, 102B described above with reference to FIG. 1 to perform an agricultural operation within a field 200 are illustrated in accordance with aspects of the present subject matter. Specifically, FIGS. 3A-3G illustrate schematic views of sequential movements of the work vehicles 102A, 102B within the field 300 after various time periods have elapsed in accordance with the route plan instructions transmitted to the work vehicles 102A, 102B. More specifically, FIG. 3A shows illustrates a schematic view of the work vehicles 102A, 102B in an initial position within the field 300, FIG. 3B illustrates a schematic view of the work vehicles 102A, 102B within the field 300 after a first period of time has elapsed since initiation of the agricultural operation, FIG. 3C illustrates a schematic view of the work vehicles 102A, 102B within the field 300 after a second period of time (longer than the first period of time) has elapsed since initiation of the agricultural operation, FIG. 3D illustrates a schematic view of the work vehicles 102A, 102B within the field 300 after a third period of time (longer than the first and second periods of time) has elapsed since initiation of the agricultural operation, FIG. 3E illustrates a schematic view of the work vehicles 102A, 102B within the field 300 after a fourth period of time (longer than the first, second, and third periods of time) has elapsed since initiation of the agricultural operation, FIG. 3F illustrates a schematic view of the work vehicles 102A, 102B within the field 300 after a fifth period of time (longer than the first, second, third, and fourth periods of time) has elapsed since initiation of the agricultural operation, and FIG. 3G illustrates a schematic view of the work vehicles 102A, 102B within the field 300 after a sixth period of time (longer than the first, second, third, fourth, and fifth periods of time) has elapsed since initiation of the agricultural operation.

As shown in the embodiment illustrated in FIGS. 3A-3G, the field 300 is configured substantially similar to the field 200 described above with reference to FIGS. 2A-2D, in that the field 300 includes a working area 302 and a headland area 304 configured to surround at least a portion of the working area 302. The working area 302 extends in an operating direction of the vehicles 102A, 102B (indicated by arrows 307 in FIGS. 3A-3G) between a first end 308 and a second end 310, Additionally, as shown in FIGS. 3A-3G, a plurality of swath lines 306 extend in the operating direction 307 between the first and second ends 308, 310 of the working area 302. Similar to the embodiment described above, each swath line 306 is subdivided in accordance with the route plan instructions into a first work route segment 306A, extending along a first section or length $D_A$ of each swath line 306, and a second work route segment 306B, extending along a second section or length $D_B$ of each swath line 306. Moreover, the first and second work route segments 306A, 306B (hereinafter referred to as "first and second segments 306A, 306B") are separated along each swath line 306 by an interior transition region 306C, extending along a third section or length $D_C$ of each swath line 306.

However, unlike the transition regions 206C described above with reference to FIGS. 2A-2D, the interior transition region 306C of each swath line 306 shown in FIGS. 3A-3G is offset from a centralized location between the first and second ends 308, 310 of the working area 302 such that the first and second segments 306A, 306B are of different lengths. Additionally, as shown in the illustrated embodiments, the positions of the interior transition regions 306C may alternate between pairs of adjacent swath lines 306. In this regard, pairs of adjacent transition regions 306C are generally shown in dotted lines as grouped transition regions within the working area 302. For example, as shown in FIGS. 3A-3G, a set of first pairs 306C(1) of the transition regions 306C are positioned at a first location within the working area 302 along the associated swath lines 306, while a set of second pairs 306C(2) of the transition regions 306C are positioned at a second location within the working area 302 along the associated swath lines 306. In one embodiment, each first pair 306C(1) of transition regions 306C may be positioned at a location within the field 200 closer to the second end 310 of the working area 302, while each second pair 306C(2) of transition regions 306C may be positioned at a location within the field 200 closer to the first end 308 working area 302.

In some embodiments, the first and second pairs 306C(1), 306C(2) of transition regions 306C may be offset from the respective end 308, 310 of the working area 302 by approximately the same distance. For example, in one embodiment, each of the first and second pairs 306C(1), 306C(2) may be centered at a respective position located about 20-40% of the length 307 of the working area 302 from the respective end 308, 310 of the working area 302. In other words, each of the first and second pairs 306C(1), 306C(2) may be offset from a centerline 312 of the field by about 10-30% of the length 307, such that each of the first and second pairs 306C(1), 306C(2) is positioned between the respective end 308, 310 of the working area 302 and the centerline 312. In the embodiment shown, the first and second pairs 306C(1), 306C(2) are positioned equidistantly from the centerline 312 towards the respective ends 308. 310 of the working area 302. Alternatively, while not shown, in some embodiments, the pairs of transition regions 306C(1), 306C(2) may instead be positioned at differing lengths from the respective end 308, 310 in each of the swath lines 306.

Additionally, each interior transition region 306C may further be associated with one or more midland turning points 309. For example, the route plan instructions for performing a given agricultural operation within the working area 302 may be associated with instructing the work vehicles 102A, 102B to transition between adjacent swath lines 306 at the midland turning point(s) 309 associated with such swath lines 306. In FIGS. 3A-3G, only one midland turning point 309 is shown within the interior transition region 306C associated with each swath line 306. However, in other embodiments, each transition region 306C may be associated with a first midland turning point (not shown) assigned to the first work vehicle 102A and a second midland turning point (not shown) assigned to the second work vehicle 102B, with the first and second midland turning points being positioned at the same or different positions within the transition region 206C provided along each swath line 206.

In several embodiments, the route plan instructions generated by the central route planning unit 104 may assign each work vehicle 102A, 102B to work a given set of route segments (e.g., the first segments 306A or the second segments 306B), For instance, in the embodiment shown in FIGS. 3A-3G, the first work vehicle 102A has been assigned to work the first route segments 306A while the second work vehicle 102B has been assigned to work the second route segments 306B.

In some embodiments, the route plan instructions for the work vehicles 102A, 102B may provide that the work vehicles 102A, 102B simultaneously operate along the same swath line 306 (e.g., by generating instructions that include starting positions for the first and second work vehicles 102A, 102B along the same swath line 306). For example, the first and second work vehicles 102A, 102B may be instructed to initially move to opposed ends of the same swath line 306 before beginning to perform the agricultural operation within the working area 302. More specifically, as shown in FIG. 3A, the first and second work vehicles 102A, 102B may be configured to be initially positioned in the same or similar way as the configuration described above for FIG. 2A, such that the first work vehicle 102A is initially positioned at the first end 308 of a first swath line 306(1) within the working area 302 and the second work vehicle 102B is initially positioned at the second end 310 of the first swath line 306(1). In such an embodiment, the first work vehicle 102A is configured to travel along the first segment 306A of the first swath line 306(1) towards the interior transition region 206C in a first initial travel direction (shown with arrow 307A in FIG. 3B), while the second work vehicle 102B is configured to travel along the second segment 306B of the first swath line 306(1) towards the transition region 306C in a second initial travel direction (shown with arrow 307B in FIG. 3B), substantially opposite the first initial travel direction 307A.

However, as discussed above with reference to FIG. 2A, the first and second work vehicles 102A, 102B may instead be initially positioned at any other suitable location along the first swath line 306(1) and correspond to any suitable corresponding initial travel direction.

In several embodiments, the route plan instructions may specify that the first and second work vehicles 102A, 102B simultaneously begin performing the associated agricultural operation within the working area 302. In the example shown in FIGS. 3A-3G, the transition region 306C and the corresponding midland turning point 309 of the first swath line 306(1) are positioned at a location offset from a centralized location between the first and second ends 308, 310 of the working area 302. As such, the first and second work vehicles 102A, 102B are configured to respectively travel in the first and second initial travel directions 307A, 307B towards the midland turning point 309 across different distances. Thus, it may be acceptable for the route plan instructions to specify that the first and second work vehicles 102A, 102B begin working the first swath line 306(1) simultaneously, because the two work vehicles 102A, 102B will not reach the midland turning point 309 at the same time (assuming that they are traveling at the same speed). For example, as shown in FIG. 3B, the first and second work vehicles 102A, 102B both begin working their respective first and second segments 306A, 306B of the first swath line 306(1) simultaneously or substantially simultaneously. Since the second segment 306A for the first swath line 306(1) is shorter than the corresponding first segment 306B, the second work vehicle 102B reaches the midland turning point 309 of the first swath line 306(1) while the first work vehicle 102A is still working the first segment 306A of the first swath line 306(1). Upon the second work vehicle 102A reaching the interior transition region 306C of the first swath line 306(1) after completing its associated work along the second segment 306A, the route plan instructions may then instruct the second work vehicle 102B to turn or transition to the midland turning point 309 of an adjacent second swath line 306(2) while the first work vehicle 102A continues to work the first segment 306A of the swath line 306(1), as shown in FIG. 3C. Thus, due to the offset positioning of the transition region 306O relative to the center of the working area 302, the vehicles 102A, 102B reach the transition region at different times despite the simultaneous starting times, thereby reducing the likelihood of any collisions between the vehicles 102A, 102B.

Additionally, in some embodiments, the positioning of the interior transition regions 306C within the working area 302 may be selected such that the first and second work vehicles 102A, 102B work one or more of the swath lines 306 separately and one or more of the other swath lines 306 simultaneously for at least some period of time. For instance, as shown in FIG. 3D, the second work vehicle 102B may finish working the second swath line 306(2) and transition to an adjacent third swath line 306(3) at the second end 310 of the working area 302 while the first work vehicle 102A finishes working the first swath line 306(1) and transitions to the second swath line 306(2). Further, as shown in FIG. 3E, the second work vehicle 102B may finish working the third swath line 306(3) and transition to an adjacent fourth swath line 306(4) while the first work vehicle 102A finishes working the second swath line 306(2) and transitions to the third swath like 306(3). As such, the first and second work vehicles do not simultaneously work either of the second or third swath lines 306(3), thereby preventing collisions at the transition regions 306C. However, as shown in FIG. 3F, when the second work vehicle 102B begins working the fourth swath line 306(4), the first work vehicle 102A may finish working the third swath line 306(3) and transition to the fourth swath line 306(4). Therefore, as shown in FIG. 3G, the first and second work vehicles 102A, 102B may simultaneously work the respective segments 306A, 306B of the fourth swath line 306(4) and transition at the same time to an adjacent fifth swath line 306(5), where the work vehicles 102A, 102B may again follow the pattern starting with FIG. 3A. With such simultaneous working of one or more of the swath lines 306 intermittently throughout the operation of the vehicles 102A, 102B, the work vehicles 102A, 102B are kept more closely together within the field 300 to make overseeing and monitoring the work vehicles 102A, 102B easier for an operator.

Figure 4:
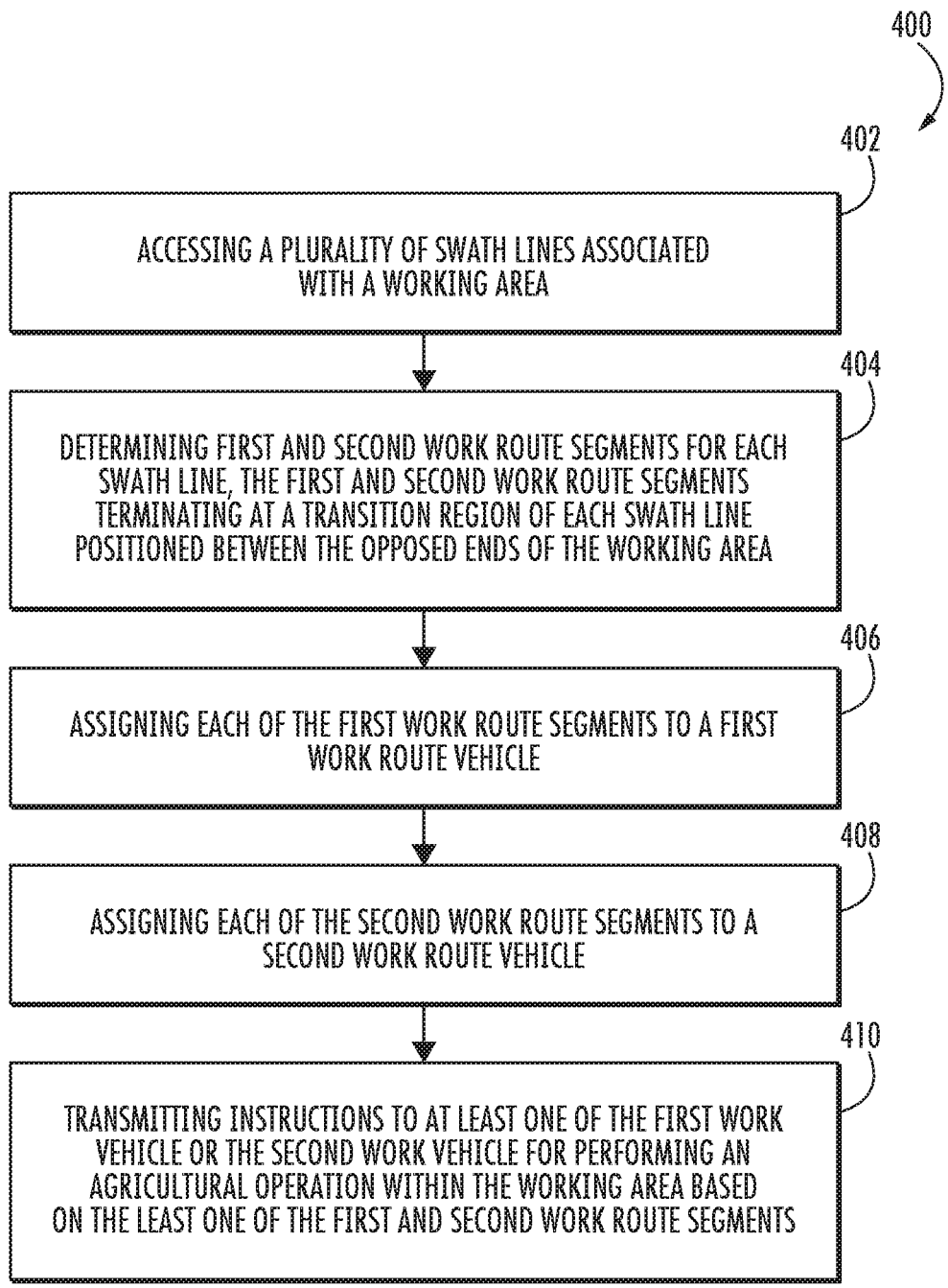
FIG. 4 illustrates a flow diagram of one embodiment of a method for determining work routes for first and second agricultural work vehicles in accordance with aspects of the present subject matter.

Referring now to FIG. 4, a flow diagram of one embodiment of a method 400 for determining work routes for agricultural work vehicles is illustrated in accordance with aspects of the present subject matter. In general, the method 400 will be described herein with reference to the system 100 described above with reference to FIG. 1, as well as the example work route embodiments shown in FIGS. 2A-2D. However, it should be appreciated that the disclosed method 400 may be implemented with systems having any other suitable system configuration and/or in connection with the determination of any suitable work routes for agricultural work vehicles, such as the work routes depicted in FIGS. 3A-3G, in addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (402), the method 400 may include accessing, with a computing device, a plurality of swath lines associated with a working area. For instance, as indicated above, the predetermined guidance or swath lines 206 may be stored within the memory of one or more of the computing devices of the disclosed system, such as the vehicle controllers 102A, 102B and/or the central route planning device 104. In such an embodiment, the associated computing device may access the swath lines 206 stored within its memory to allow the computing device to develop or generate suitable route plan instructions for guiding one or more associated work vehicles 102A, 102B along the swath lines 206.

Additionally, at (404), the method 400 may include determining, with the computing device, first and second work route segments for each swath line to guide first and second work vehicles when perforating an agricultural operation within the working area. As indicated above, when generating routes for the work vehicles 102A, 102B, each swath line 206 may be divided into first and second work route segments 206A, 206B, with the route segments 206A, 206B terminating at a corresponding interior transition region 206C positioned between the opposed ends 208, 210 of the swath line 206. In such an embodiment, the first and second route segments 206A, 206B may extend from opposed ends 208, 210 of the swath line 206 to the associated interior transition region 206C.

Moreover, at (406), the method 400 may include assigning, with the computing device, each of the first work route segments to the first work vehicle. For example, as indicated above, the central route planning device 104 may assign the first work route segments 206A to the first work vehicle 102A.

Similarly, at (408), the method 400 may include assigning, with the computing device, each of the second work route segments to the second work vehicle. For example, as indicated above, the central route planning device 104 may assign the second work route segments 206B to the second work vehicle 102B.

Still referring to FIG. 4, at (410), the method 400 may include transmitting, with the computing device, instructions to at least one of the first work vehicle or the second work vehicle for performing the agricultural operation within the working area based on at least one of the first and second work route segments. For example, as indicated above, the central route planning device 104 may transmit instructions to the first work vehicle 102A and/or the second work vehicle 102B to perform the agricultural operation(s) within the working area 202 based on at least one of the first and second route segments 206A, 206B.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining work routes for agricultural work vehicles, the method comprising:
   accessing with an central route planning unit, a plurality of swath lines associated with a working area stored on a memory device of the central route planning unit, the plurality of swath lines extending between opposed ends of the working area;
   dividing, with a route planning module of the central route planning unit, the plurality of stored swath lines into first and second work route segments to guide first and second work vehicles when performing an agricultural operation within the working area, the first work route segment extending along a first section of at least one swath line and the second work route segment extending along a second section of at least one swath line, the first and second work route segments terminating at a transition region of each swath line positioned between the opposed ends of the working area, wherein the route planning module associates an implementation time and position of the first and second work route segments;
   assigning, with the route planning module, the first work route segment to the first work vehicle;
   assigning, with the route planning module, the second work route segment to the second work vehicle;
   transmitting, with a communications module of the central route planning unit, instructions to a vehicle controller of at least one of the first work vehicle or the second work vehicle; and
   controlling, with the vehicle controller, the operation of one or more components of the at least one of the first work vehicle or the second work vehicle for performing the agricultural operation within the working area based on at least one of the first and second work route segments.

2. The method of claim 1, further comprising associating, with the central route planning unit, one or more midland turning points with each transition region.

3. The method of claim 2, wherein the instructions are associated with instructing the at least one of the first work vehicle or the second work vehicle to transition between adjacent swath lines of the plurality of swath lines at the one or more midland turning points associated with the adjacent swath lines.

4. The method of claim 1, wherein the transition region associated with each swath line is offset from a centralized location within the working area.

5. The method of claim 4, wherein:
   first pairs of the transition regions associated with pairs of adjacent swath lines are positioned at a first distance from a centerline of the working area, and
   second pairs of the transition regions associated with other pairs of adjacent swath lines are positioned at a second distance from a centerline of the working area.

6. The method of claim 5, wherein the first distance is equal to the second distance.

7. The method of claim 1, wherein the transition region associated with each swath line is centrally located between the opposed ends of the working area.

8. The method of claim 1, wherein the instructions determined by the central route planning unit are associated with instructing the at least one of the first work vehicle or the second work vehicle such that the first and second work vehicles begin working the respective first and second work route segments at differing starting times.

9. The method of claim 8, wherein the central route planning unit is configured to assign the first and second work vehicles to simultaneously work one or more of the swath lines for at least a period of time.

10. The method of claim 1, wherein the instructions determined by the central route planning unit are associated with instructing the at least one of the first work vehicle or the second work vehicle such that the first and second work vehicles simultaneously begin working the respective first and second work route segments.

11. The method of claim 1, wherein the central route planning unit is onboard one of the first work vehicle or the second work vehicle.

12. The method of claim 1, wherein the central route planning unit is remote to both of the first and second work vehicles.

13. A system for determining work routes for agricultural work vehicles, the system comprising:
   a first work vehicle configured to perform an agricultural operation within a working area;
   a second work vehicle configured to perform the agricultural operation within the working area; and
   a controller communicatively coupled to the first and second work vehicles, the controller including a processor and associated memory, the memory storing instructions that, when executed by the processor, configure the controller to:
      access a plurality of swath lines associated with the working area stored in the memory, the plurality of swath lines extending between opposed ends of the working area;
      divide each swath line of the plurality of swath lines into first and second work route segments to guide the first and second work vehicles when performing the agricultural operation within the working area, the first work route segment extending along a first section of each swath line and the second work route segment extending along a second section of each swath line, the first and second work route segments terminating at a transition region of each swath line positioned between the opposed ends of the working area;
      determine and associate a timing with a position of the first and second work vehicles traversing the first and second work route segments such that the first and second work vehicles do not simultaneously reach the transition region;
      assign each of the first work route segments to the first work vehicle;

assign each of the second work route segments to the second work vehicle; and transmit instructions to at least a vehicle controller of at least one of the first work vehicle or the second work vehicle for performing the agricultural operation within the working area based on at least one of the first and second work route segments.

14. The system of claim 13, wherein:
one or more midland turning points are associated with each transition region of the plurality of swath lines, and
the instructions are associated with instructing the at least one of the first work vehicle or the second work vehicle to transition between adjacent swath lines of the plurality of swath lines at the one or more midland turning points associated with the adjacent swath lines.

15. The system of claim 13, wherein the first and second work vehicles simultaneously work one or more of the swath lines for at least a period of time.

16. The system of claim 13, wherein the instructions are associated with instructing the at least one of the first work vehicle or the second work vehicle such that the first and second work vehicles begin working the respective first and second work route segments at differing starting times.

17. The system of claim 13, wherein the instructions are associated with instructing the at least one of the first work vehicle or the second work vehicle such that the first and second work vehicles simultaneously begin working the respective first and second work route segments.

18. The system of claim 13, wherein the transition region associated with each swath line of the plurality of swath lines is offset from a centralized location within the working area.

19. The system of claim 13, wherein the transition region associated with each swath line of the plurality of swath lines is centrally located between the opposed ends of the working area.

20. The system of claim 13, wherein the vehicle controller is configured to implement the instructions by controlling at least one of the engine or transmission of at least one of the first and second vehicle.

* * * * *